United States Patent [19]
Hedenberg

[11] Patent Number: 5,947,009
[45] Date of Patent: Sep. 7, 1999

[54] AUTOMATIC BAKING APPARATUS AND MIXBAG THEREOF

[75] Inventor: Rolf P. Hedenberg, Gran Caneria, Spain

[73] Assignee: Heden-Team AG, Triesenberg, Liechtenstein

[21] Appl. No.: 09/192,183

[22] Filed: Nov. 16, 1998

Related U.S. Application Data

[60] Provisional application No. 60/065,770, Nov. 17, 1997.

[51] Int. Cl.$^6$ .............................. A47J 27/62; A47J 37/01
[52] U.S. Cl. ................................ 99/348; 99/353; 99/426; 206/219; 206/221; 366/240
[58] Field of Search ............................ 99/325–328, 341, 99/348, 352–355, 426, 449, 342; 366/69, 130, 143, 145, 146, 149, 219, 240, 341, 349, 602; 222/94, 98, 100–102; 206/219, 221; 383/38; 426/128, 233, 232, 392, 394, 405, 87, 112, 113, 120, 124, 523, 512

[56] References Cited

U.S. PATENT DOCUMENTS

| | | |
|---|---|---|
| 4,550,653 | 11/1985 | Hedenberg ................................ 99/348 |
| 4,550,654 | 11/1985 | Hedenberg ................................ 99/348 |
| 4,590,850 | 5/1986 | Hedenberg ................................ 99/348 |
| 4,803,086 | 2/1989 | Hedenberg ................................ 426/87 |
| 5,146,840 | 9/1992 | Hedenberg ................................ 99/328 |

Primary Examiner—Timothy F. Simone
Attorney, Agent, or Firm—Jacobson, Price, Holman & Stern, PLLC

[57] ABSTRACT

An automatic baking apparatus for baking food products from dough having upper and lower holding devices (14, 16, 76) to be affixed to either end of a flexible, sealable mixbag (44) which mixbag contains ingredients for dough. A dough preparation and baking station (24) having a slit (37, 41) at the top and bottom portions. Kneading devices (22, 24, 39, 43, 56) for mechanically working the ingredients in the mixbag. Devices for creating relative reciprocating movement between the mixbag and the slit openings and heating means (18, 20) in at least a portion of the dough preparation and baking station 25 so as to bake the kneaded ingredients. The kneading devices situated in the top and bottom portions of the apparatus, the top and bottom slits (37, 41) are each formed by a set of two adjacent members (22, 24, 39, 43, 56). Each member has a kneading surface (36, 38, 40, 42) defining the slit between each set and through which slit the mixbag passes. Each kneading surface being part of a support structure (60, 62, 66, 70, 72) which is resilient and each support structure being attached to each respective member. At least one of the members (22, 43) being movable relative to the other member in each set.

39 Claims, 7 Drawing Sheets and# AUTOMATIC BAKING APPARATUS AND MIXBAG THEREOF

This application is claiming the priority of Provisional Application No. 60/065,770, filed Nov. 17, 1997.

BACKGROUND OF THE INVENTION

The present invention deals with a baking apparatus for automatically making baked food products such as bread, cakes, and the like. This baking apparatus is primarily for use in the home and automatically makes the baked product individually. Baking, for example, bread, is a complicated process, both time-consuming and work-intensive, as well as requiring extensive clean-up. The quality of the bread in the main depends upon the ingredients, the fermentation time and temperature, and must be done under precise conditions. Few people in today's fast-moving world have the time and, for that matter, the knowledge, to bake fresh homemade bread. The instant invention is drawn to an automatic baking apparatus coupled with a mixbag, which mixbag has on it in the form of indicia the exact recipe for baking the product contained in the mixbag. The contents of the mixbag are dry and all the consumer has to do is place the mixbag into the baking apparatus, hydrate the ingredients, inform the baking apparatus when the desired baked product is to be ready, and start the process. If the baking recipe is for three hours and it is desired to have the bread at 7:00 a.m. the next morning, then automatically the baking apparatus will start the baking procedure at 4:00 in the morning, and at 7:00 the baked product will be ready for consumption.

DESCRIPTION OF THE PRIOR ART

Automatic baking apparatus and mixbags have been developed by the instant inventor and assignee and the present invention is a further, and extremely important improvement on what has gone before. U.S. Pat. Nos. 4,550,653; 4,550,654; 4,590,850; 4,803,086; and 5,146,840 teach various embodiments for automatically kneading and baking a product. However, the teachings of each of these patents have disadvantages, namely: requiring a large number of parts for construction; because of their kneading means all of these patents require a large apparatus to give vertical and horizontal space to the water filled mixbag; they all leave a dough residue on the inside walls of the mixbag after scraping off during and after the kneading operation in order to keep the dough within a dough preparation station; and the apparatus of the patents unduly stress the mixbag due to friction between the mixbag and the kneading means.

The object of the present invention is therefore to solve the above-mentioned problems of prior art baking apparatuses.

The overall problem is to provide a kneading means that, while requiring a minimum of parts for construction, enables the insertion of a water filled mixbag in an initial position requiring a minimum of space between the kneading means. Since a mixbag containing the ingredients for a dough initially has water and dry ingredients in separate compartments, the mixbag is bulky and tends to require a fairly large space between the kneading means in a direction transverse to the mixbag and between the holders of the mixbag in a direction longitudinal the mixbag.

An aspect of the problem is to provide kneading means that, during and after the kneading operation, efficiently scrapes off dough residues from the inside walls of the mixbag. In particular, the scraping operation should be capable of adapting to a changing volume of the mixbag due to different stages in the mixbag of wet and dry ingredients, as well as to a changing stiffness of the mixbag ingredients due to a progressive softening of the dough achieved by the kneading operation.

SUMMARY OF THE INVENTION

According to another aspect of the problem, It is extremely important when the mixbag is reciprocated between the kneading surfaces in the baking apparatus that there is sufficient slippage on one hand between the kneading surface and the mixbag so as not to unduly tension the mixbag material and cause it to fail, yet the ingredients of the mixbag cannot be allowed to pass through the upper and lower kneading means. Furthermore, it is important that the mixbag be securely and easily mounted in the baking apparatus by the consumer, yet at the end of the kneading cycle, it is necessary that the top portion of the mixbag be able to be easily freed from the top securing means and rolled up on a bottom roller in the baking apparatus thereby depositing the dough in a baking tray.

One embodiment of the invention is a baking apparatus of the kind described in the prior art, but which has kneading means at the top and bottom of the baking apparatus defining slits. The top and bottom slits are each formed by a set of two adjacent members, each member has a kneading surface defining a slit between each set and through which slit the mixbag passes. Each kneading surface is a part of a support structure which is resilient and each support structure is preferably non-rotatably attached to its respective member.

In a preferred embodiment at least one of the members of each top and bottom set is movable relative to the other member of that set. In particular, the problem is solved by a kneading apparatus wherein at least one of the kneading surfaces of each set is moved away from the adjacent kneading surface when installing the mixbag in its initial position. During operation, i.e. when the dough is kneaded by means of relative reciprocating movement between the mixbag and the slit openings of the baking apparatus, the width of the slit is adapted to the current condition of the mixbag and the adaptation is actuated by the mixbag itself. More specifically, the kneading apparatus is arranged such that at least one of the kneading surfaces at each set is moved away from the adjacent kneading surface and thus widening the slit when the mixbag passes in a first direction through said slit. Moreover, at least one of the kneading surfaces of each set is moved towards the kneading surface of the other kneading member and thus reducing the width of the slit when the mixbag passes in a second direction through the slit. The movement of the kneading surface in either direction is actuated solely by the mixbag and not by mechanical means.

In a first basic embodiment mentioned above, at least one of the kneading members is movable such that the kneading surface is folded or pivoted away from the adjacent kneading surface. This is a particularly preferred embodiment for the top set of kneading members.

In a second basic embodiment, at least one of the kneading surfaces is attached to a resilient support structure allowing movement of the kneading surface rather than the kneading member such that the set of kneading surfaces opens and closes the slit by virtue of its shape.

Another aspect of the invention is the way in which the mixbag is attached to the top and bottom rollers of the baking apparatus to permit reciprocal motion. The mixbag has top and bottom edges, each having a width and two longitudinal sides extending between the top and bottom edges. There is a permanent seal along the bottom edge and the two longitudinal sides, the mixbag being open at the top. The bottom edge and the two top edges are reinforced. The top roller has at least one, and preferably two longitudinal slits extending radially inwardly and curved at its lower portion, and the bottom roller has one longitudinal slit extending radially inwardly and curved at its lower portion. The depth and the width of the roller slits are commensurate with the reinforced top and bottom portions of the mixbag. The mixbag is attached to the respective rollers by inserting the reinforced portions of the mixbag into the commensurately shaped slit(s) in each of the respective rollers. Alternatively and preferably, the top and bottom rollers have male protrusions commensurate in size and shape to holes in the bottom edge and the top two edges of the mixbag. The number of holes is equal to or greater than the number of male protrusions and the mixbag is attached to the respective roller by inserting each of the male protrusions of the respective roller into the commensurately shaped holes in the reinforced portions of the mixbag.

DESCRIPTION OF THE PREFERRED EMBODIMENTS

Figure 1:
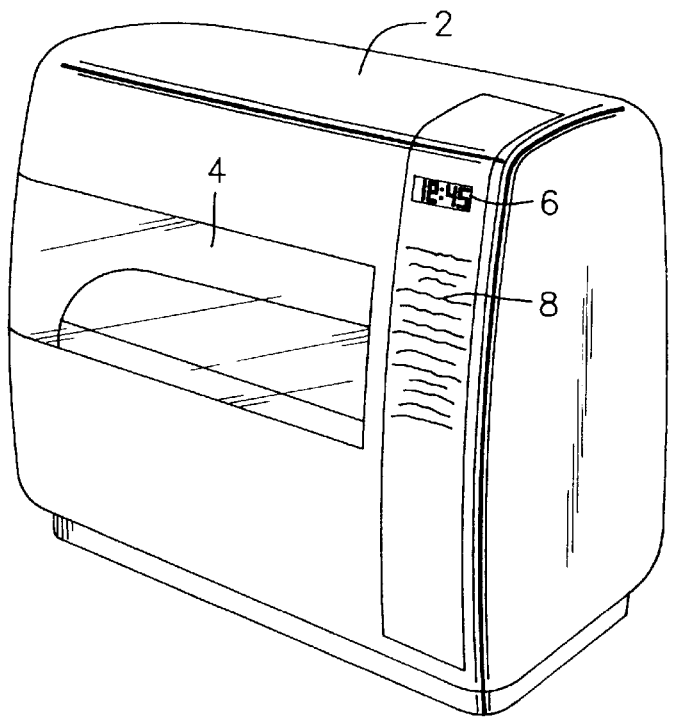
FIG. 1 is perspective front elevation of the outer housing of the baking apparatus.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The baking apparatus illustrated is basically of the type described in U.S. Pat. No. 5,146,840 which patent is incorporated by reference.

FIG. 1 shows the outer housing of the baking apparatus wherein the housing 2 has an attractive and rounded shape and contained on the outer surface is a window 4, an LCD readout 6 and basic instructions 8. It is conveniently dimensioned and aesthetically-shaped and colored so as to be a welcome addition to the consumer's kitchen.

Figure 2:
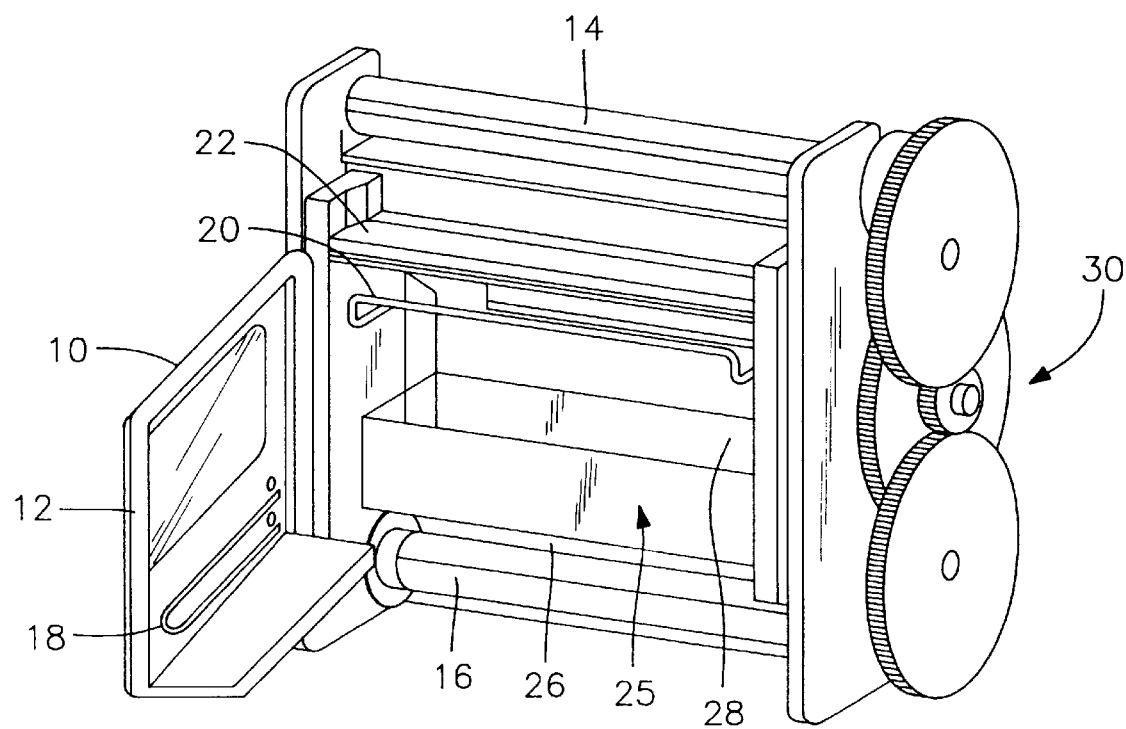
FIG. 2 is a front elevational perspective of the baking apparatus without the outer housing showing the front door open.

FIG. 2 shows the inside workings of the baking apparatus wherein there is an upper roller 14 and a lower roller 16. These rollers are driven by means for achieving a relative reciprocating movement between the mixbag and the slit openings defining a baking and kneading space. The means are a transmission device of some kind, e.g. drive gears 30, as illustrated in FIG. 2, transmission cords or belts, or any other construction for transmission of reciprocating movement. There is a baking tray 25 located intermediate the rollers and a lower heating element 18 and an upper heating element 20 for baking the kneaded dough. There is a door 10 which has a seal 12 for sealing the baking and kneading space of the baking apparatus. Two lower kneading members are part of the lower portion of the baking tray 25 and two upper kneading members are located above the baking tray and below the upper roller.

Figure 3:
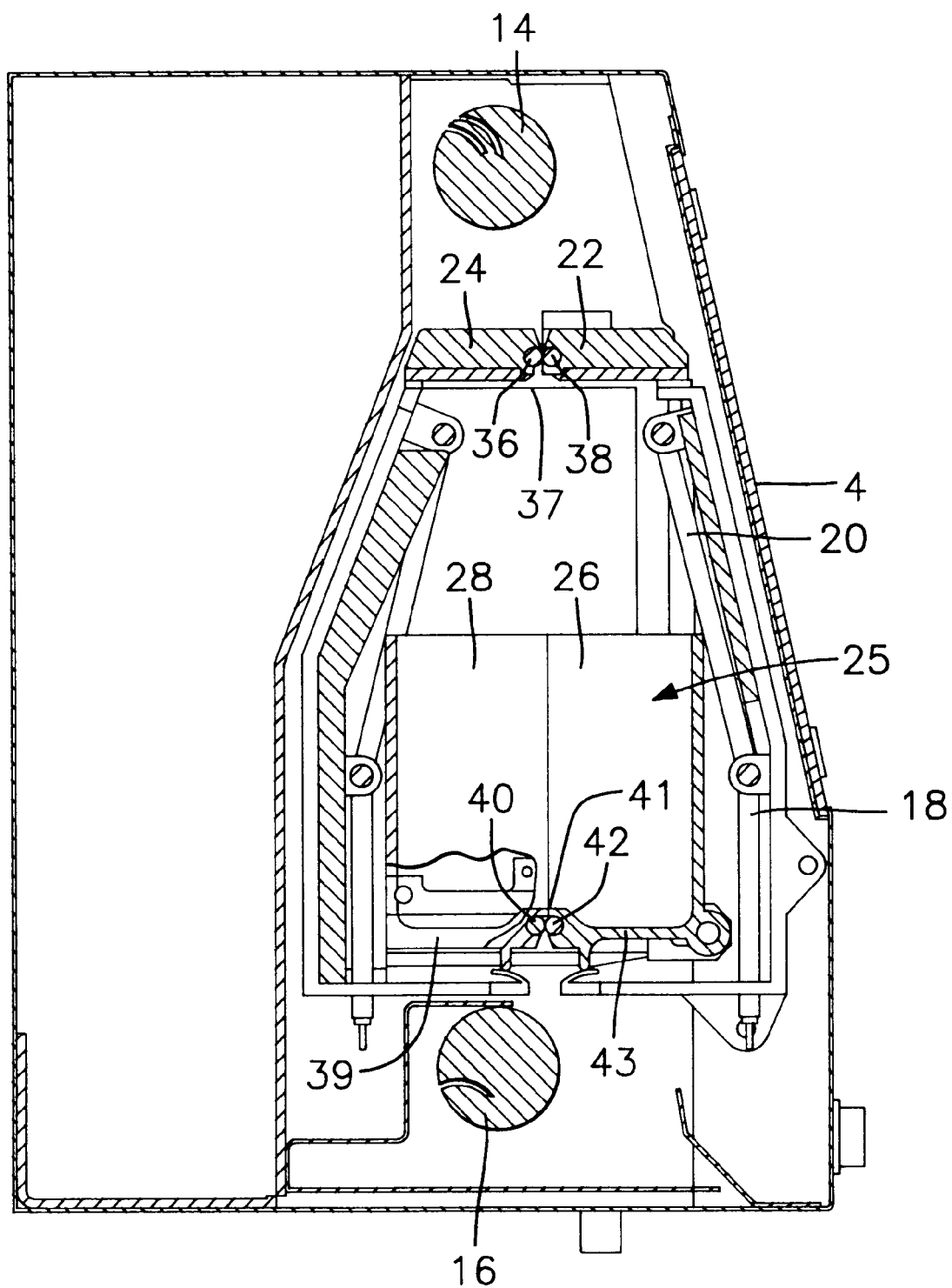
FIG. 3 is a side elevational cross-section of the baking apparatus.

FIG. 3 is a elevation cross-section showing the upper roller 14 and lower roller 16 lined up with the upper slit 37 and the lower slit 41. These two slits are respectively defined by the upper kneading support structures 36 and 38 and the lower kneading support structures 40 and 42. The support structures are attached to the respective upper members 22 and 24 and the lower members 39 and 43. The lower members are part of the baking tray 25 which baking tray is split in half and has a fixed baking tray portion 28 and a movable baking tray portion 26.

Figure 4:
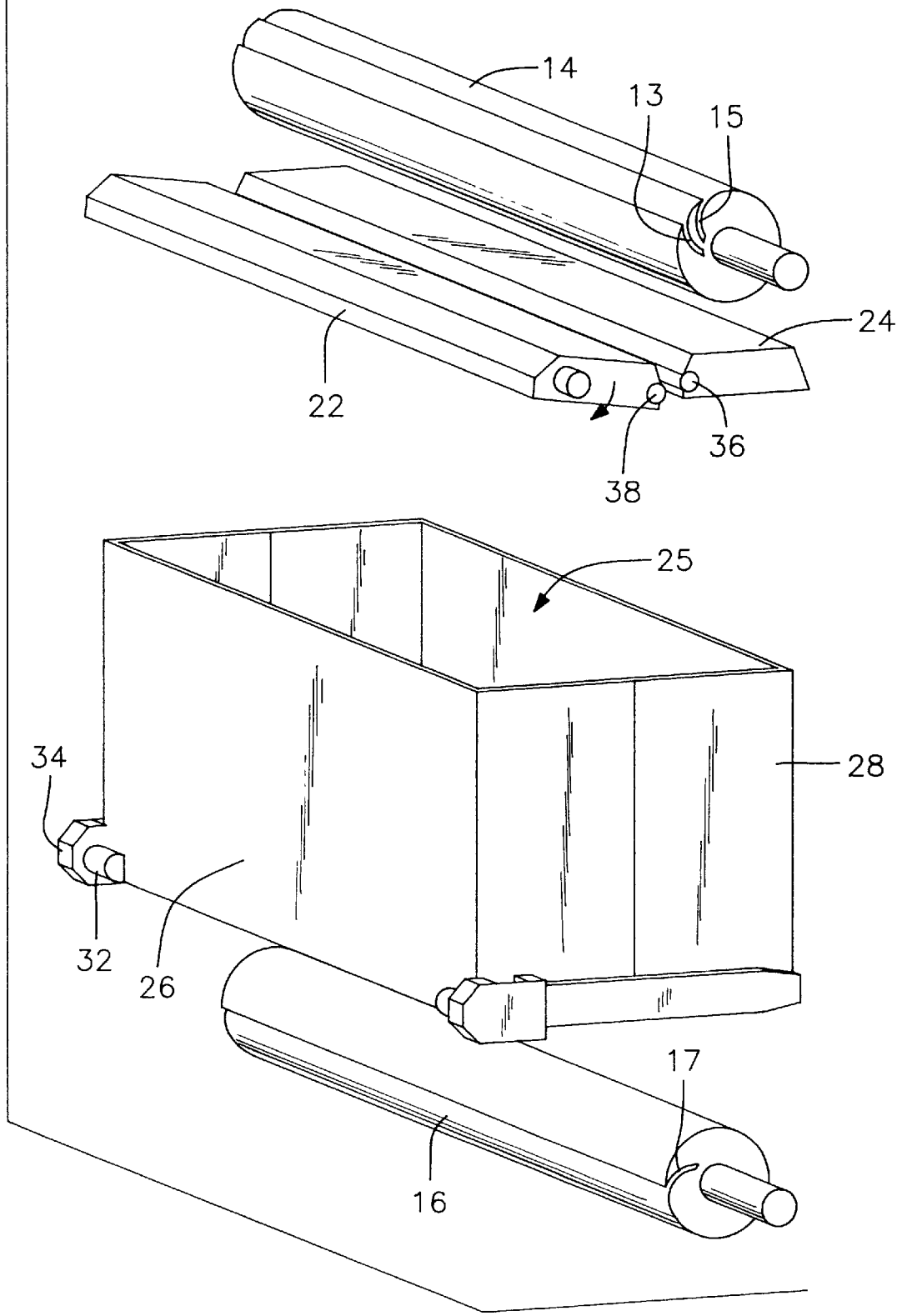
FIG. 4 is a schematic of the kneading means and baking tray of the baking apparatus showing the upper kneading means in open position.

FIG. 4 schematically shows the upper roller 14 with the two longitudinal radially curved slits 13 and 15. Also seen is lower roller 16 with a single longitudinal slit 17, radially curved. The top member 22 is movable and rotates downwardly when the mixbag moves downwardly so as to adapt to the thickness and stiffness of the mixbag which changes throughout the kneading operations to relieve friction between the mixbag and the upper kneading surfaces and to allow escape of the gases from the mixbag. The moveable top member 22 may also be arranged so as to be removable from its pivot holder so as to allow easier installation of the mixbag. The baking tray 25 has a fixed half 28 and movable half 26, which movable half is mounted by a pivot means 32 co-acting with a pivot holder 34.

Figure 5:
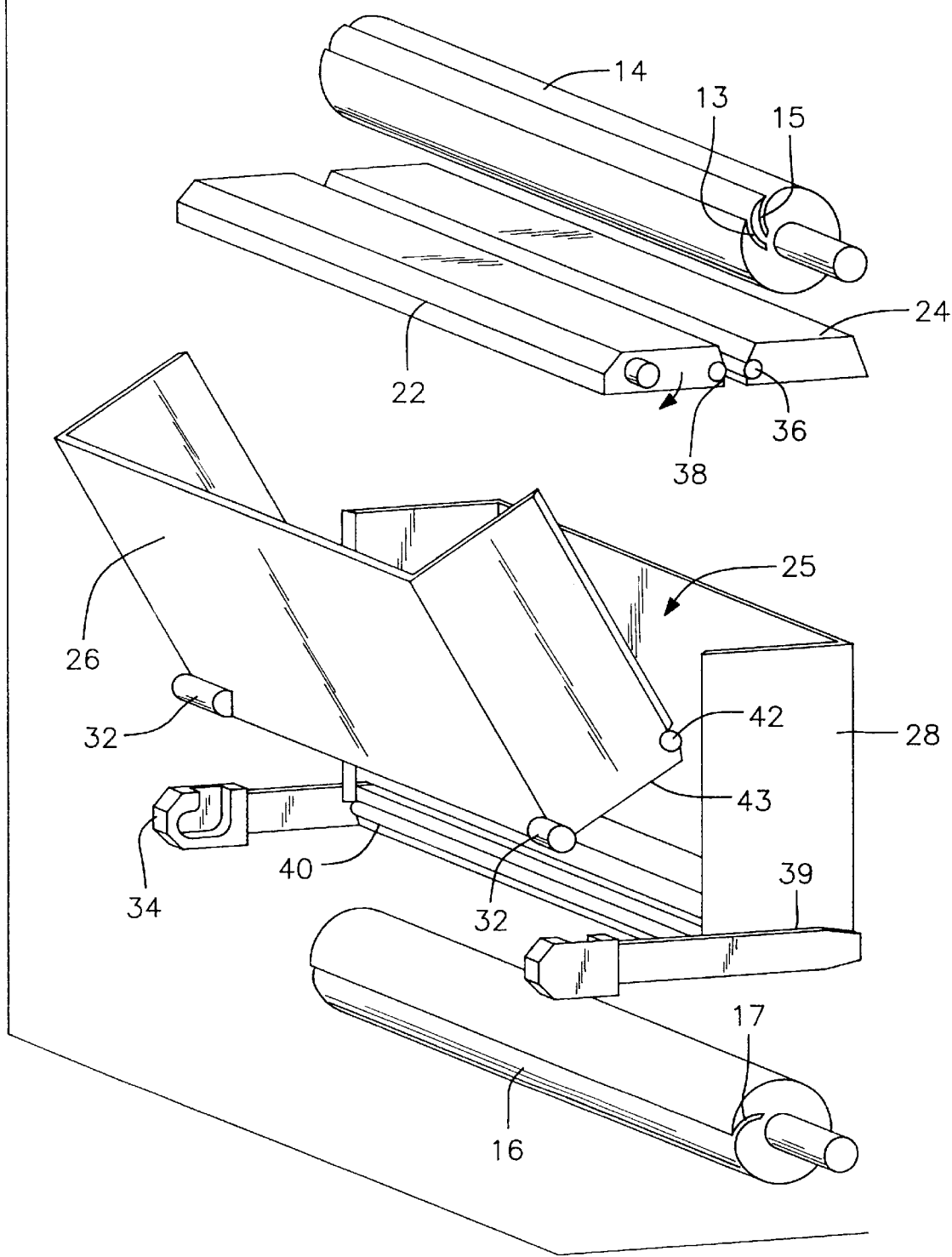
FIG. 5 is a schematic of the kneading means and baking tray of the baking apparatus showing the lower kneading member in open position.

Looking at FIG. 5, which is a schematic of the mixbag moving in the upward direction, it will be seen that the movable half of the baking tray 26 moves on the pivot means 32 upwardly so as to adapt to the thickness and stiffness of the mixbag and to relieve friction between the mixbag and the lower kneading surfaces when the mixbag is in the upward cycle. The movable half pivots in the pivot holder 34 in FIG. 5 shows the movable half 26 in an upward position, but also the Figure shows how the movable half can be removed from the pivot holder 34 so as to allow easier installation of the mixbag. The same type of pivot holder can be used on top member 22 to allow its removal. The upper members 22 and 24 are moved into the closed position such that the nip between the upper kneading support structures 36 and 38 is at its smallest dimension, which dimension is only sufficient to allow the mixbag to pass between, but not sufficient to allow the mixbag ingredients to pass between and thus any dough residue is scraped or squeezed off of the inside walls of the mixbag. The same happens in FIG. 4 when the mixbag goes in the downward direction, i.e., the nip between the lower kneading support structures 40 and 42 is at its smallest dimension so as to allow passage of the mixbag, but not the ingredients.

Figure 6:
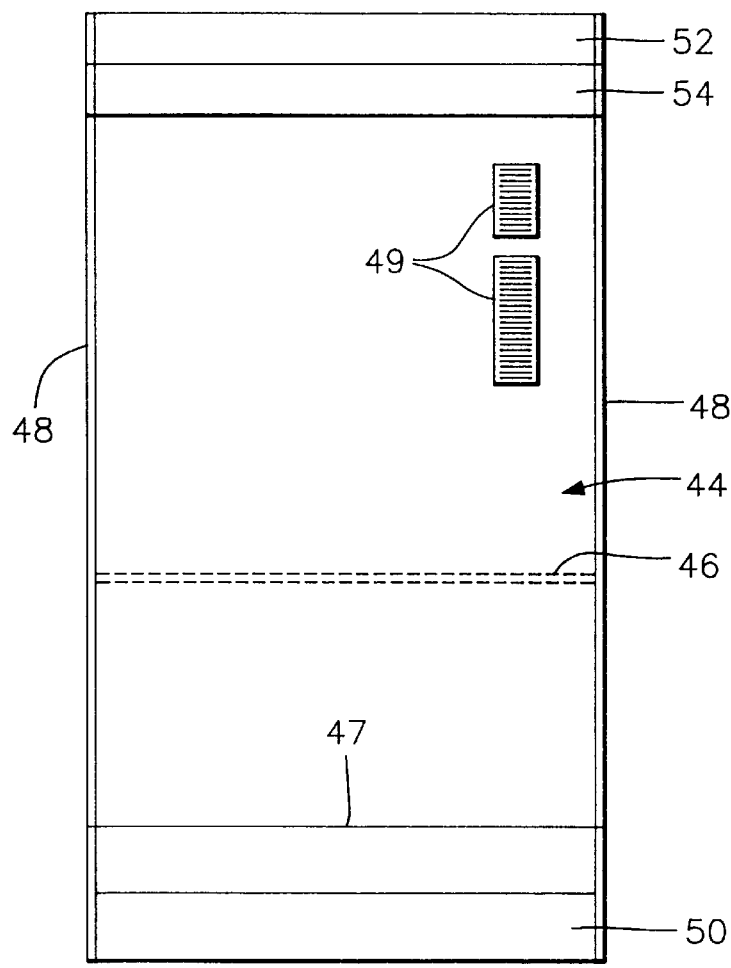
FIG. 6 is a front elevation of the mixbag.
Figure 7:
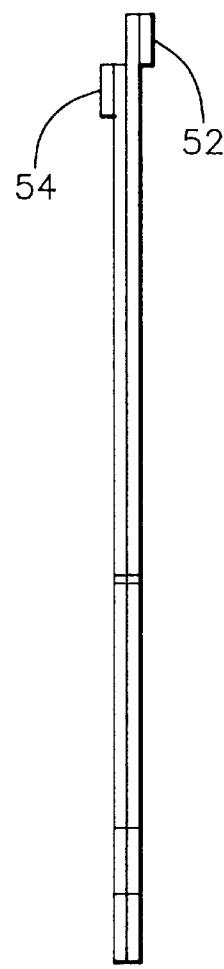
FIG. 7 is a side elevation of the mixbag.

FIG. 6 shows the mixbag which has two upper edges 52 and 54 and one bottom edge portion 50, which bottom edge portion is permanently sealed as are the longitudinal edges 48 running between the upper and the bottom edges. The seal in the bottom edge forms a reinforced bottom edge portion 50 and the top edge portions 52 and 54 are reinforced as best seen in FIG. 7. Preferably a further permanent seal 47 is made above bottom edge portion 50, and the area between edge portion 50 and seal 47 is also permanently sealed. An indicia 49 is placed on the front surface of the mixbag which indicia can be in two parts, one part opening a microprocessor contained in the baking apparatus (not shown) which then allows reading of the other part of the indicia which is the complete recipe for the ingredients in that particular mixbag. That recipe determines the time and temperature of kneading, rising, and the number of kneading and rising cycles, so as to perfectly bake into a finished product whatever ingredients are placed in the mixbag. The mixbag also has a burstable seal 46 which defines two compartments in the mixbag, the lower compartment between seals 46 and 47 being hermetically sealed and containing the dry ingredients for that particular baked product, and the upper compartment of the mixbag, above seal 46, being openable so that the user can place water in it.

In use, the mixbag containing the desired to-be-baked product would be placed into the baking apparatus by opening the door 10 and placing the lower reinforced portion 50 into slit 17 of the lower roller. Then the baking apparatus would be actuated so as to slightly lower the mixbag so that the upper reinforced portion 54 can be placed in slit 13 on upper roll 14. This then permits access to the upper portion of the mixbag which is then filled with the proper amount of water. The top reinforced portion 52 is then placed in the top slit 15. The baking apparatus is again actuated and the mixbag is reciprocated so that a barcode reader, or other reading means (not shown) in the baking apparatus can read the indicia 49 and program in the recipe for the ingredients of that particular mixbag into the microprocessor (not shown) in the baking apparatus. The user then indicates when the baked product is to be completed and if the recipe is a four-hour recipe, the baking apparatus will go into a dwell state until four hours before the desired time to have the baked product completed and then will start the baking process. During that dwell, the dry ingredients are not hydrated and therefore the yeast, which is contained with the dry ingredients, is not activated. When the desired time to begin the baking cycle arrives, the baking apparatus goes through a complete reciprocating motion so as to force the water from the upper portion of the mixbag against the burstable seal 46 and burst the burstable seal thereby hydrating the dry ingredients. Then the mixbag goes through the required number of reciprocating motions which works the hydrated dry ingredients into a dough, basically in the same way as a rolling pin kneads the dough during the traditional kneading process. On the upward cycle, the dough is squeezed against the nip of the upper kneading structures 36 and 38 and the nip dimension is such that the dough cannot pass through the nip but it rolled back onto itself. Likewise, in the downward cycle of the mixbag, the same thing happens at the nip between the lower kneading support structures 40 and 42. The temperature is controlled by the heating elements 18 and 20, and the kneading and the rise between kneading cycles are all determined by the recipe that has been inputted to the microprocessor (not shown) from the indicia. When the kneading process is complete, the lower roll 16 turns clockwise and pulls the top reinforced portions 52 and 54 from slits 15 and 13 of the top roller. The lower roller 16 continues rolling in a clockwise direction squeezing the dough and scraping the dough residue off the inside walls of the mixbag as the mixbag passes through the lower slit 41 into the baking tray 25 and removing the mixbag from the baking tray by rolling it up onto the lower roller 16. The dough is then baked in the baking tray until the baked product is ready. This is at the precise time that the user inputted into the machine, and when the user comes into the kitchen to remove the baked product, the kitchen will be filled with a fresh baked aroma. The front door 10 is opened and the movable part 26 of the baking tray is removed, taking care to use a hot pad as the baking tray is still at an elevated temperature. The baked product is then removed. The used mixbag is simply unrolled off of the lower roller 16 and thrown away.

Figure 9:
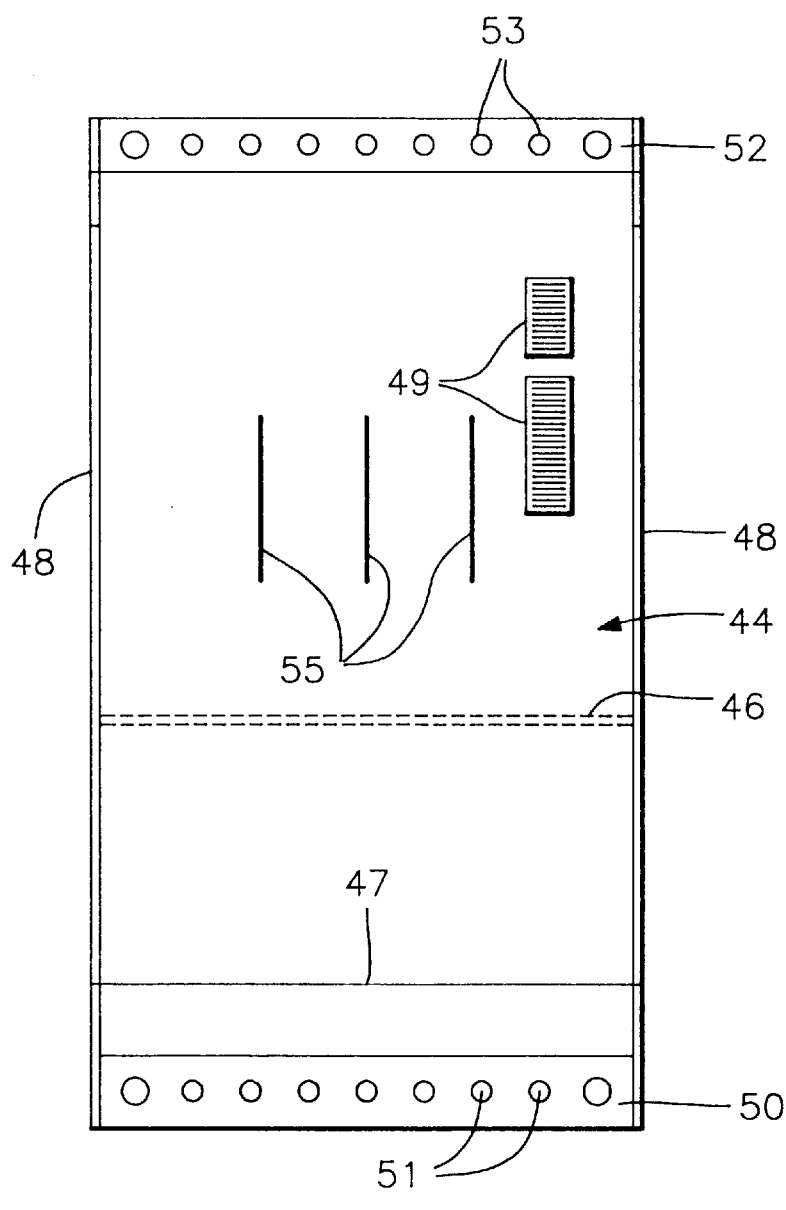
FIG. 9 is a front elevation of the second embodiment of the mixbag.

FIG. 9 is a second embodiment of the mixbag. This embodiment is in essence the same as the first embodiment as will be seen by the same reference numerals. The two main differences are that the mixbag is used in conjunction with a different type of upper and lower roller, which rollers have male protrusions (see the discussion of FIGS. 12A–C) and consequently the top and bottom reinforced portions 52 and 50 respectively have holes 53 and 51 respectively commensurate in size and shape to the male protrusions for holding the mixbag onto the upper and lower rollers. The second difference is the burstable seals 55 which are placed in the water portion of the mixbag longitudinal to the mixbag.

Figure 10:
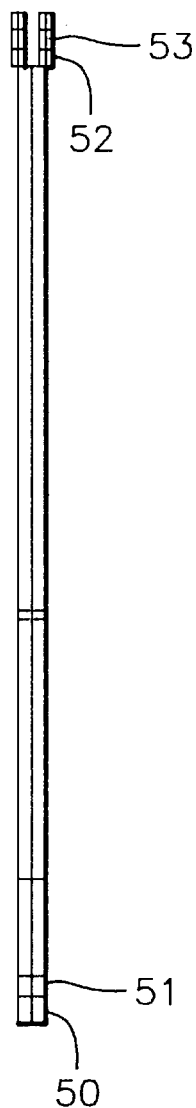
FIG. 10 is a side elevation of the second embodiment of the mixbag.

The lower reinforced portion 50 as seen in both FIGS. 9 and 10 is a permanently sealed portion. Preferably the area between the permanent seal 47 and the reinforced portion 50 is also permanently sealed. Within the reinforced portion 50, along the width of the mixbag, are formed holes 51 which are the same size and shape as the male protrusions in the embodiment of the rollers seen in FIGS. 12A–C. Preferably these are at least as many holes 51 as there are male protrusions on the FIGS. 12A–C embodiment of the rollers and the holes are spaced commensurately with the positions of the male protrusions. The upper reinforced portion 52 of both faces of the mixbag are of the same height and preferably the outer layer of the mixbag has been folded into itself for reinforcement. The permanent seal of the longitudinal edges 48 do not go to the upper edge. This permits the two surfaces of the mixbag to be separated so as to introduced water.

Figure 12A:
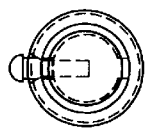
FIGS. 12A–12C respectively show the end view, side elevation view and the plan view of an embodiment of the upper and lower roller holding means.
Figure 12B:
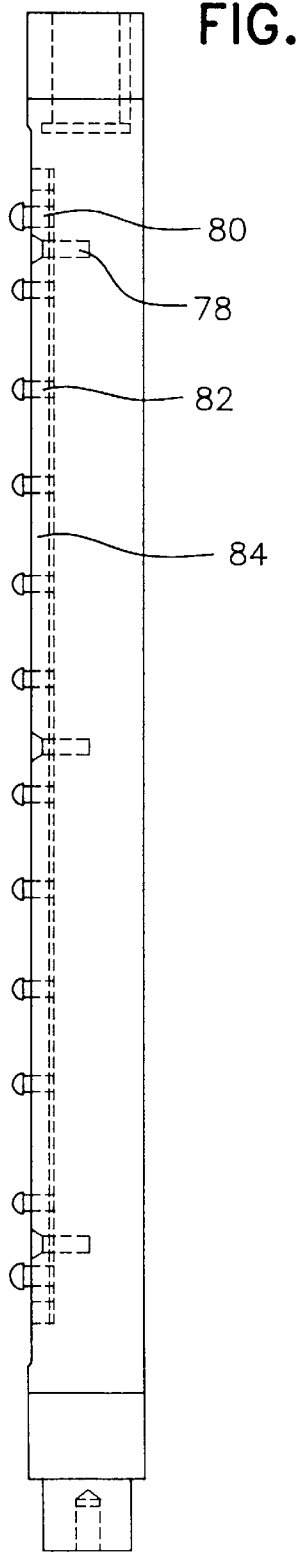
Figure 12C:
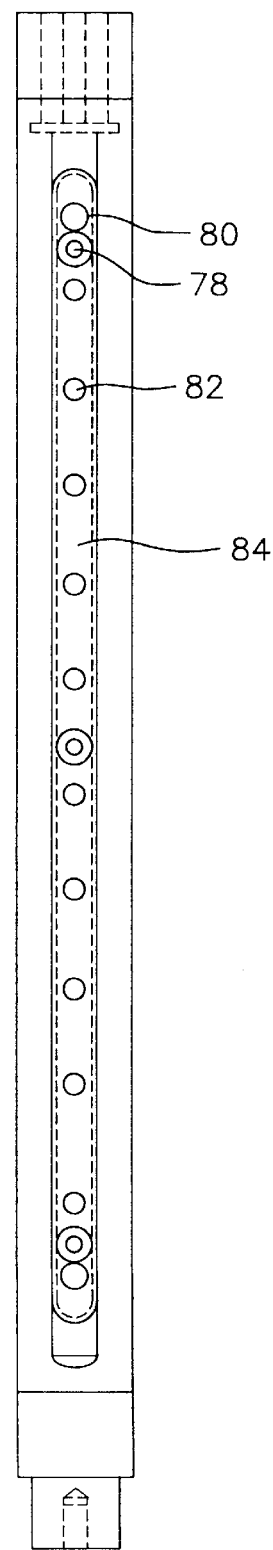

Looking at FIGS. 12A, 12B and 12C of the second embodiment of the rollers which can replace rollers 14 and 16, it will be seen that A is an end view, B is a side elevation view and C is a plan view. These rollers 76 in this embodiment simply replace rollers 14 and 16 and the male protrusions 82 and 80 are of the approximate same size and shape of the holes 51 and 53. An insert strip 84 is placed in a recessed portion along the longitudinal length of roller 76, which portion is cut out as a chord from the cylindrical shape of the roller 76. This insert 84 is attached to the roller 76 preferably by screw means 78 as seen in Figures B and C at three different longitudinal locations. Furthermore, the male protrusions 80 and 82 are two different sizes, it will be seen that at either end of the rollers 76 there is a larger diameter with a larger mushroom head male protrusion 80 as compared to a slightly smaller diameter and no mushroom head male protrusion 82. This assures that the mixbag 44 does not release from the roller 76 and permits easier application of the mixbag onto the roller.

The mixbag 44 is attached to the rollers 76 wherein the lower holes 51 in the lower reinforced portion 50 are placed onto the male protrusions 80 and 82 of the lower roller 76. Then the inside face (the face closest to the roller 76) is attached, by way of holes 53 in that face, onto the male protrusions 80 and 82 leaving the outer face unattached and therefore capable of opening and receiving water. Once the appropriate amount of water is filled into the area of the mixbag between the burstable seal 46 and the reinforced portion 52, the other face of the mixbag 44 is attached to the male protrusions 80 and 82 of upper roller 76.

It should be kept in mind that when water is placed in the mixbag 44 in the area between the burstable seal 46 and the top of the mixbag, that water tends to bulge the faces of the mixbag. In essence, looking at FIG. 10 you would see a teardrop cross-section from the burstable seal 46 up towards the reinforced portion 52, with the larger dimension of the teardrop being adjacent burstable seal 46 because of gravity. This makes the loading of the mixbag onto the upper roller awkward and when the kneading starts, creates inappropriate hydraulic pressures both on the burstable seal 46 and at the upper kneading means 22, 24, 36 and 38. In order to prevent this, two or more and preferably three burstable seals 55 are placed equal distant across the width of the mixbag 44 as seen in FIG. 9. The lower attachment of the burstable seals 55 is at the approximate upper level of the water and the burstable seals continue longitudinal the bag for an appropriate distance. This keeps the two opposite faces of the mixbag 44 more or less together and prevents the exaggerated teardrop cross-section that would otherwise occur. Consequently, when the installed mixbag goes through its first cycle which bursts the burstable seals 46 and 55, the hydraulic pressures are much more manageable.

There is a delicate balance between the kneading surfaces and the mixbag such that the frictional contact between the mixbag and the kneading surface cannot unduly tension the mixbag material so as to cause breakage. It must be kept in mind that some recipes may take a substantial number of hours and hence, there can be thousands of up-and-down movements of the mixbag through each slit and against the kneading surfaces forming the slits. The mixbag itself is preferably made of a multi-layered plastic film, the outer film layer being a biaxially stretched layer of, for instance, nylon. The inner layer is made of a material, for example, polyamide, which has high vapor an oxygen-barrier characteristics. The hermetic sealing of the dry ingredients in the mixbag must have a long shelf life, of a year or more, and the materials of the mixbag must be proven safe to be in contact with foodstuffs.

Figure 8:
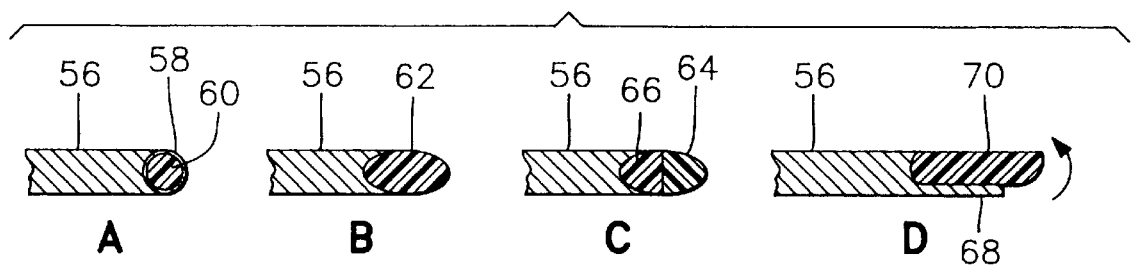
FIGS. 8A–8D are four embodiments of the kneading surfaces.

FIG. 8 shows four different embodiments of the kneading means in transverse cross-section to the nip or mixbag. For example, the mixbag would extend in and out of the plane of the paper and to the right of each of the kneading means in FIG. 8, as would the nip. These kneading means are specific embodiments of the upper and lower support structures, respectively 36, 38 and 40 and 42 as well as the upper and lower members, respectively 22, 24 and 39, 43.

Looking at FIG. 8A, there is seen a transverse cross-section of the kneading means member 56 to which is attached along its longitudinal edge a cylinder having a support structure 60 and an outer layer kneading surface 58. The kneading surface 58 preferably is a friction-reducing material, such as Teflon, or silicone. The support structure 60 is preferably silicone which is resilient compared to the material of the kneading means member 56 which is normally metal, such as stainless steel. By means of the Teflon kneading surface which has a low coefficient of friction and the resilient support structure 60, there is resilience and low friction between the kneading means of the mixbag so as to preclude breakage of the mixbag and ensure a long life of the kneading means.

FIG. 8B shows the kneading means member 56 having attached to it an elliptical, in transverse cross-section kneading surface 62 which does not have a coating on it and which preferably is made of silicone.

FIG. 8C shows a kneading means member 56 having attached to it a support structure 66, preferably of silicone and preferably being a softer material than the kneading surface 64, for example Teflon.

FIG. 8D shows the kneading means member 56 having attached to it an elongated kneading surface 70. The kneading means member 56 has a support member 68 partially along one side of the elongated kneading surface 70. The elongated kneading surface 70 is made of a resilient material, such as silicone, and because of the support member 68 the kneading surface 70 will be able to flex upward but not downward. Likewise, the support structure 68 could be placed on the top portion of the elongated kneading surface 70 so as to permit downward flexing. By means of the embodiment of FIG. 8D it is possible to replace the movable members 22, 26 as described above with an elongated kneading surface 70 which is in itself movable. Therefore members 22, 26 need not be movable. It is also possible, if the kneading surfaces do not have a sufficiently low coefficient of friction, to place a friction-reducing coating on the mixbag so as to augment the friction reduction between the mixbag and the kneading surfaces.

Figure 11:
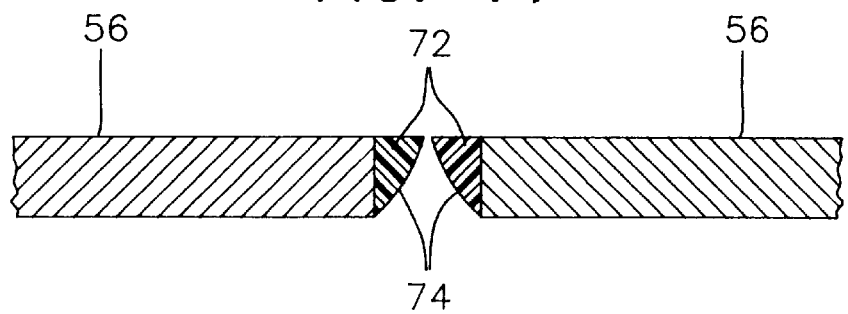
FIG. 11 is a fifth embodiment of the kneading surfaces.

FIG. 11 shows another embodiment of the kneading means. In this embodiment the two facing kneading means member 56 forming a nip there between and each have on their longitudinal edge a support structure 72, which support structure has a coating 74. The support structure is preferably silicone which is softer than the kneading means member 56 which is preferably stainless steel, and the support structure has a friction-reducing material 74 such as Teflon coated on it. The transverse cross-sectional shape of the support structure and kneading surface is important. As illustrated in FIG. 11, this kneading means would be the lower kneading means in which case the kneading means members 56 would form part of the baking tray and their upper surface would also be coated with a friction reducing material and non-sticking material such as Teflon. The nip is at the upper planar surface of this lower kneading means and the upper kneading means would simply be turned over, i.e. the nip would be at the lower planar surface of the kneading means. When the mixbag is reciprocated between the upper and lower kneading means in an embodiment such as FIG. 11, there will be frictional engagement at the nip and since the support structure 72 is flexible thereby creating a moveable kneading surface, there will be an arcuate pinching motion between the upper planar surfaces as the mixbag is moved downwardly through the nip. This will tend to reduce the dimension of the nip and the sizing of the kneading means is such that the reduction of the dimension of the nip will be optimized to the thickness of the empty mixbag thereby precluding any ingredients of the mixbag from passing through the nip. Likewise when the mixbag moves in the upward direction the same thing will happen at the upper kneading means. In this embodiment, and in the embodiment of FIG. 8D, it is not necessary to have upper and lower members 22 and 26 be movable. This can simplify the manufacture of the baking apparatus.

The invention is not limited to the embodiments described and shown but a plurality of modifications and combinations of details from the different embodiments are possible within the scope of the claims.

I claim:

1. An apparatus for automatically making baked food products from dough having:

an upper and lower holding means adapted to be affixed to either end of a flexible sealable mixbag containing ingredients for a dough;

a dough preparation and baking station having a slit at the top and bottom portions thereof for allowing said mixbag to pass through the station, the top and bottom slits each being formed by a set of two adjacent members;

kneading means for mechanically working the ingredients in said mixbag, the kneading means being at the top and bottom portions;

reciprocating mechanism for creating relative reciprocating movement between the mixbag and the slit openings of said station; and heating means in at least a portion of said dough preparation and baking station to bake the kneaded ingredients, the improvement comprising:

each of said adjacent members being provided with a kneading surface defining the slit between each set and through which slit passes the mixbag, at least one of said kneading surfaces of each set being moveable away from the adjacent kneading surface thereby widening the slit, the movement being solely actuated by the mixbag when the mixbag passes in a first direction through said slit, at least one of said kneading surfaces of each set being moveable towards the kneading surface of the other kneading member thereby reducing the width of the slit, the movement being solely actuated by the mixbag when the mixbag passes in a second direction through said slit, each kneading surface being part of a resilient support structure, each support structure being attached to its respective member.

2. The apparatus as claimed in claim 1, wherein the set of two adjacent members forming the bottom kneading means also forms the bottom surface of a baking tray in which the kneaded dough is baked in said station.

3. The apparatus as claimed in claim 1, wherein at least one of the members is movable relative to the other member in at least one of the sets.

4. The apparatus as claimed in claim 3, wherein said at least one relatively movable member of the top set of members is constructed to move downwardly when the mixbag is moving downwards.

5. The apparatus as claimed in claim 3, wherein said at least one relatively movable member of the bottom set of members is constructed to move upwards when the mixbag is moving upwards.

6. The apparatus as claimed in claim 1, wherein said kneading surfaces are made of a friction reducing material and have an appropriate cross-section in a direction transverse to said slit.

7. The apparatus as claimed in claim 6, wherein said kneading surfaces are curvilinear in cross-section and said friction reducing material is TEFLON.

8. The apparatus of claim 7, wherein said resilient support structure is silicone.

9. The apparatus of claim 6, wherein said kneading surfaces are curvilinear in cross-section and said support structures and kneading surfaces are made of silicone.

10. The apparatus of claim 6, wherein said kneading surfaces are curvilinear in cross-section and have a constant radius.

11. The apparatus of claim 6, wherein said kneading surfaces are elliptical in cross-section.

12. The apparatus of claim 1, wherein said kneading surfaces are made of friction reducing material; said support structure is intermediate the kneading surface and said member and is more resilient than said kneading surface material, so as to allow greater flexibility of the kneading surface.

13. The apparatus as claimed in claim 1, wherein at least one of said kneading means members has an elongated kneading surface in cross-section in a direction transverse to said slit and the elongated kneading surface is made of a resilient material allowing it to move relative to the adjacent member.

14. The apparatus of claim 13, wherein said top and bottom kneading means members are attached to said elongated kneading surfaces so as to only allow downward relative movement in the top set and upward relative movement in the bottom set.

15. The apparatus as claimed in claim 1, wherein the cross-section in a direction transverse to said slit of said kneading means members is a half hemisphere, the upper surface of said support structure forming a planar surface with the flat of the half hemisphere, of the kneading means in the bottom portion and the lower surface of said support structure forming a planar surface with the flat of the half hemisphere of the kneading means of the top portion.

16. The apparatus of claim 1 in combination with a mixbag, wherein said mixbag has top and bottom edges having a width and two longitudinal sides extending between said top and bottom edges, a permanent seal along the bottom edge and two longitudinal sides, the mixbag being open at the top, said bottom edge and two top edges being reinforced along said width to form reinforced top and bottom portions.

17. The apparatus of claim 16, wherein said mixbag is provided with a plurality of openings along said reinforced top and bottom portions.

18. The apparatus of claim 16, wherein said mixbag is made of a multi-layered plastic film, the outer film layer being biaxially stretched nylon and the inner layer being polyamide having high vapor and oxygen barrier properties.

19. The apparatus as claimed in claim 16, wherein said upper and lower holding means are rollers having a length at least equal to the width of said mixbag top and bottom reinforced portions, said rollers each having at least one longitudinal slit extending radially inwardly the respective roller and curved at its lower portion thereof such that the depth and width of the roller slit is commensurate with said reinforced top and bottom portions.

20. The apparatus as claimed in claim 19, wherein each end of said mixbag is attached to the respective roller by inserting the reinforced portion of the mixbag into the commensurately shaped slit in each respective roller.

21. The apparatus as claimed in claim 20, wherein said top roller has two slits and each of the two top reinforced edges are inserted into a different one of said two slits.

22. The apparatus as claimed in claim 17, wherein said upper and lower holding means are rollers having a length at least equal to the width of said mixbag top and bottom reinforced portions, said rollers each being provided across their longitudinal periphery with male protrusions which are commensurate in shape and size with the openings at the top and bottom portions of the mixbag.

23. The apparatus as claimed in claim 22, wherein each end of said mixbag is attached to the respective roller by placing the openings of the mixbag onto the commensurately shaped male protrusions of each respective roller.

24. The apparatus as claimed in claim 22, wherein at least some of said male protrusions have a mushroom shape at their upstanding end so as to mechanically interlock the mixbag thereon.

25. The apparatus as claimed in claim 16, wherein said mixbag has a burstable seal across its width thereby separating the dough ingredients from an upper compartment intended for water; said upper compartment has a plurality of burstable seals longitudinal the mixbag, starting at approximately the height of the water and extending upwardly an appropriate distance.

26. The apparatus as claimed in claim 1, wherein all of said kneading surfaces are non-rotatable relative to each respective member.

27. A kneading apparatus for mechanically working the ingredients of a mixbag containing the ingredients for a dough; the kneading device having two adjacent elongated kneading members each being provided with a kneading surface defining a slit between said adjacent members and through which slit passes the mixbag during operation;

the improvement comprising at least one of said adjacent kneading members is constructed such that its kneading surface is moveable away from the kneading surface of the other kneading member thereby widening the slit, the movement being solely actuated by the mixbag when the mixbag passes in a first direction through said slit, and such that its kneading surface is moveable towards the kneading surface of the other kneading member thereby reducing the width of the slit, the movement being solely actuated by the mixbag when the mixbag passes in a second direction through said slit.

28. The apparatus as claimed in claim 27, wherein at least one of the kneading surfaces has a cross-section in a direction transverse to said slit such that:

the kneading surface is moveable away from the kneading surface of the other kneading member by the mixbag when the mixbag passes in a first direction through said slit thereby widening the slit, and such that the kneading surface is moveable towards the kneading surface of the other kneading member by the mixbag when the mixbag passes in a second direction through said slit, thereby reducing the width of the slit.

29. The apparatus as claimed in claim 28, wherein at least one of the kneading surfaces is part of a resilient support structure, the support structure being attached to its respective kneading member and constructed to enable said movement of the kneading surface.

30. The apparatus as claimed in claim 29, wherein said resilient support structure is silicone.

31. The apparatus as claimed in claim 27, wherein said kneading surfaces are made of a friction reducing material.

32. The apparatus as claimed in claim 27, wherein said kneading surfaces are curvilinear in cross-section in a direction transverse to the slit.

33. The apparatus as claimed in claim 32, wherein said support structures and kneading surfaces are made of silicone.

34. The apparatus as claimed in claim 27, wherein said kneading surfaces are curvilinear in cross-section in a direction transverse to the slit and have a constant radius.

35. The apparatus as claimed in claim 27, wherein said kneading surfaces are elliptical in cross-section in a direction transverse to the slit.

36. The apparatus as claimed in claim 27, wherein said kneading surfaces are made of friction reducing material; said support structure is intermediate the kneading surface and said member and is more resilient than said kneading surface material, so as to allow greater flexibility of the kneading surface.

37. The apparatus as claimed in claim 27, wherein at least one of said kneading members has an elongated kneading surface in cross-section in a direction transverse to said slit and the elongated kneading surface is made of a resilient material allowing it to move relative to the adjacent member.

38. The apparatus as claimed in claim 29, wherein the cross-section in a direction transverse to said slit of at least one of said kneading surfaces is a half hemisphere.

39. The apparatus as claimed in claim 27, wherein there are two sets of two adjacent elongated kneading members and at least one of the members is moveable relative to the other member.

* * * * *